(12) United States Patent
Fan (10) Patent No.: US 10,838,291 B2
(45) Date of Patent: Nov. 17, 2020

(54) ILLUMINATION SYSTEM AND PROJECTION DEVICE

(71) Applicant: Coretronic Corporation, Hsin-Chu (TW)

(72) Inventor: Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/823,307

(22) Filed: Mar. 18, 2020

(65) Prior Publication Data

US 2020/0301262 A1 Sep. 24, 2020

(30) Foreign Application Priority Data

Mar. 22, 2019 (CN) .......................... 2019 1 0220055

(51) Int. Cl.
| | |
|---|---|
| *G03B 21/20* | (2006.01) |
| *G02B 27/10* | (2006.01) |
| *F21V 9/30* | (2018.01) |
| *F21Y 105/12* | (2016.01) |

(52) U.S. Cl.
CPC .............. *G03B 21/204* (2013.01); *F21V 9/30* (2018.02); *G02B 27/102* (2013.01); *G03B 21/208* (2013.01); *G03B 21/2013* (2013.01); *F21Y 2105/12* (2016.08)

(58) Field of Classification Search
CPC ........................... G03B 21/204; G03B 21/208; G03B 21/2013; G02B 27/102; F21V 9/20; F21V 9/30; F21Y 2105/12; F21Y 2105/16
See application file for complete search history.

(56) References Cited

U.S. PATENT DOCUMENTS

| | | | |
|---|---|---|---|
| 2015/0219984 A1* | 8/2015 | Matsubara | G03B 21/2053 353/31 |
| 2017/0343891 A1* | 11/2017 | Sakata | G03B 21/206 |
| 2018/0031958 A1* | 2/2018 | Ikeda | G03B 21/204 |
| 2020/0174355 A1* | 6/2020 | Liu | G03B 21/208 |

FOREIGN PATENT DOCUMENTS

| | | |
|---|---|---|
| CN | 201190964 | 2/2009 |
| CN | 103968268 | 8/2014 |

* cited by examiner

*Primary Examiner* — Alan B Cariaso
(74) *Attorney, Agent, or Firm* — JCIPRNET (57) ABSTRACT

An illumination system and a projection device are provided. The illumination system includes first excitation light sources, an excitation light source module, a wavelength conversion element and a light combining element. The excitation light source module includes second excitation light sources adapted to emit second excitation light beams and third excitation light sources adapted to emit third excitation light beams. The excitation light source module has a first symmetric axis and a second symmetric axis perpendicular to each other, where the second excitation light sources and the third excitation light sources are respectively arranged symmetrically relative to the first symmetric axis, and the second excitation light sources and the third excitation light sources are respectively arranged symmetrically relative to the second symmetric axis. The projection device includes the illumination system, a light valve and a projection lens. The illumination system and the projection device of the invention have smaller size, and are adapted to provide illumination beam and projection image with uniform color distribution.

24 Claims, 7 Drawing Sheets

ILLUMINATION SYSTEM AND PROJECTION DEVICE

CROSS-REFERENCE TO RELATED APPLICATION

This application claims the priority benefit of China application serial no. 201910220055.6, filed on Mar. 22, 2019. The entirety of the above-mentioned patent application is hereby incorporated by reference herein and made a part of this specification.

BACKGROUND

Technical Field

The invention relates to an optical system and an optical device, and particularly relates to an illumination system and a projection device applying the illumination system.

Description of Related Art

In a known projector framework, red light may be generated in two methods. The first method is to use a blue light beam to irradiate a phosphor layer of a phosphor wheel to output yellow light, and then use a filter wheel of a projector to extract the red light required in the image. However, such method requires using the phosphor wheel and the filter wheel at the same time, so that a volume of the projector is difficult to be reduced. The other method is to directly use a red light source to provide the red light. However, such method difficulty reduces the size of the projector due to the required space to configuring the red light source and an optical path thereof.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an illumination system and a projection device, which has a smaller size, and is capable of providing an illumination light beam with uniform color distribution.

The invention is directed to a projection device, which has a smaller volume, and is capable of providing a projection image with uniform color distribution.

Other objects and advantages of the invention may be further illustrated by the technical features broadly embodied and described as follows.

In order to achieve one or a portion of or all of the objects or other objects, an embodiment of the invention provides an illumination system including a plurality of first excitation light sources, an excitation light source module, a wavelength conversion element and a light combining element. The first excitation light sources are configured to emit a plurality of first excitation light beams. The excitation light source module includes a plurality of second excitation light sources and a plurality of third excitation light sources, where the second excitation light sources are configured to emit a plurality of second excitation light beams, and the third excitation light sources are configured to emit a plurality of third excitation light beams. The wavelength conversion element is disposed on a transmission path of the first excitation light beams, and is configured to convert the first excitation light beams into a converted light beam. The light combining element is disposed on a transmission path of the second excitation light beams and the third excitation light beams, and reflects the converted light beam to the transmission path of the second excitation light beams and the third excitation light beams. The excitation light source module has a first symmetric axis and a second symmetric axis, the first symmetric axis and the second symmetric axis are perpendicular to each other, where the second excitation light sources and the third excitation light sources are respectively arranged symmetrically relative to the first symmetric axis, and the second excitation light sources and the third excitation light sources are respectively arranged symmetrically relative to the second symmetric axis.

In order to achieve one or a portion of or all of the objects or other objects, an embodiment of the invention provides a projection device including the aforementioned illumination system, a light valve and a projection lens. The illumination system is configured to emit an illumination light beam. The light valve is disposed on a transmission path of the illumination light beam to convert the illumination light beam into an image light beam. The projection lens is disposed on a transmission path of the image light beam.

Based on the above description, in the illumination system of the embodiment of the invention, by integrating the plurality of second excitation light sources and the plurality of third excitation light sources in one excitation light source module, the second excitation light beams and the third excitation light beams may have a same optical path, so as to reduce a volume. Moreover, the plurality of second excitation light sources and the plurality of third excitation light sources of the excitation light source module are symmetrically arranged, such that incident angles of the second excitation light beams and the third excitation light beams irradiating the subsequent optical element are similar to each other, so as to provide the illumination light beam with uniform color distribution. The projection device of the invention includes the aforementioned illumination system, so as to achieve a smaller size, and provide a projection image with uniform color distribution.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
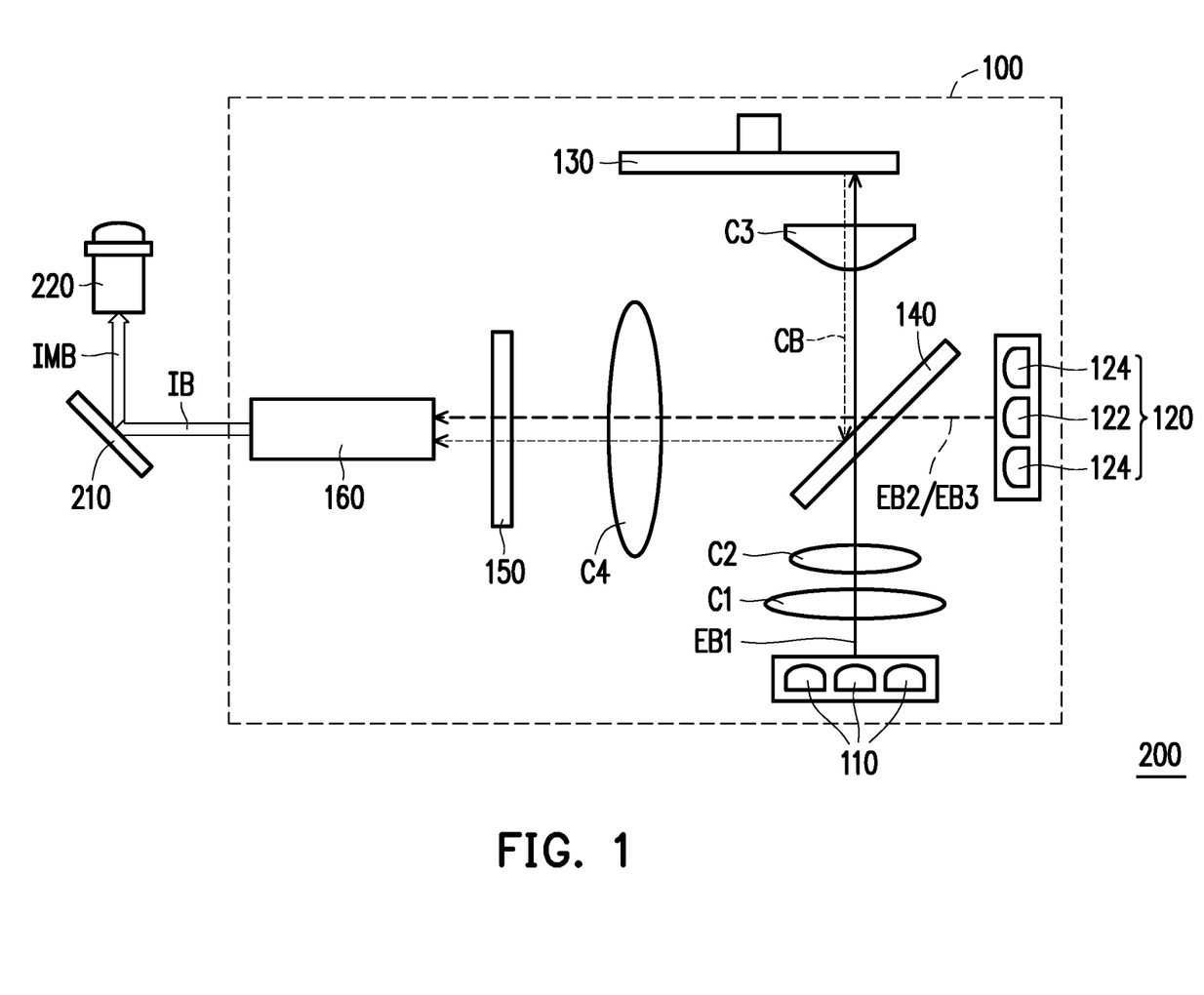
FIG. 1 is a schematic diagram of a projection device according to an embodiment of the invention.

FIG. 1 is a schematic diagram of a projection device according to an embodiment of the invention. FIG. 2A to FIG. 2H are front views of various implementations of an excitation light source module in FIG. 1. FIG. 3 is a front view of a wavelength conversion element in FIG. 1. Referring to FIG. 1, the projection device 200 of the embodiment includes an illumination system 100, a light valve 210 and a projection lens 220. The illumination system 100 is configured to emit an illumination light beam IB. The light valve 210 is disposed on a transmission path of the illumination light beam IB to convert the illumination light beam IB into an image light beam IMB. The projection lens 220 is disposed on a transmission path of the image light beam IMB, and is configured to project the image light beam IMB onto a screen or a wall (not shown) to form an image frame. Since after the illumination light beam IB of different colors irradiates the light valve 210, the light valve 210 sequentially converts the illumination light beam IB of different colors into the image light beam IMB and transmits the image beam IMB to the projection lens 220, the image formed by the image light beam IMB converted by the light valve 210 and projected out of the projection device 200 may be a colour image.

In the embodiment, the light valve 210 is, for example, a reflective spatial light modulator such as a Digital Micromirror Device (DMD), or a Liquid-Crystal-On-Silicon (LCOS) panel. However, in other embodiments, the light valve 210 may also be other spatial light modulator such as a transparent Liquid Crystal Display Panel (LCD panel), etc. In the embodiment, an amount of the light valve 210 may be one or plural, and since those skilled in the art may learn enough instructions and recommendations for detailed steps and implementations corresponding to different amounts of the light valve 210 from common knowledge of the field, detailed description thereof is not repeated.

In the embodiment, the projection lens 220, for example, includes one optical lens or a combination of a plurality of optical lenses having refractive power, for example, and the optical lenses include a non-flat lens, such as a biconcave lens, a biconvex lens, a concavo-convex lens, a convexo-concave lens, a plano-convex lens, a plano-concave lens, or a variety of combinations thereof. The kind and type of the projection lens 220 of are not limited by the invention.

As shown in FIG. 1, the illumination system 100 includes a plurality of first excitation light sources 110, an excitation light source module 120, a wavelength conversion element 130 and a light combining element 140. The first excitation light sources 110 are configured to emit a plurality of first excitation light beams EB1. The excitation light source module 120 includes a plurality of second excitation light sources 122 and a plurality of third excitation light sources 124, where the second excitation light sources 122 emit a plurality of second excitation light beams EB2, and the third excitation light sources 124 emit a plurality of third excitation light beams EB3. It should be noted that in FIG. 1 (and FIG. 4), in order clearly indicate the transmission paths of the light beams, the plurality of first excitation light beams EB1 are represented by a combined light beam, and the plurality of second excitation light beams EB2 and the plurality of third excitation light beams EB3 are represented by a combined light beam. However, the plurality of first excitation light beams EB1 may be a plurality of light beams separated from each other, and the plurality of second excitation light beams EB2 and the plurality of third excitation light beams EB3 may also be a plurality of light beams separated from each other.

In an embodiment, the first excitation light sources 110, the second excitation light sources 122 and the third excitation light sources 124 are generally referred to as light sources capable of emitting light beams with specific wavelengths, wherein the first excitation light beams EB1 emitted by the first excitation light source 110 and the second excitation light beams EB2 emitted by the second excitation light source 110 may have a first color, and the third excitation light beams EB3 emitted by the third excitation light sources 124 may have a second color, and a difference between main wavelengths of the first color and the second color is greater than or equal to 50 nm. For example, a peak wavelength (i.e. the main wavelength) of the first color, for example, falls within a wavelength range of blue light, and a peak wavelength of the second color, for example, falls within a wavelength range of red light, wherein the peak wavelength is defined as a wavelength corresponding to the maximum light intensity. The first excitation light sources 110, the second excitation light sources 122 and the third excitation light sources 124 may be arrays or groups consisting of Laser Diodes (LDs), Light Emitting Diodes (LEDs) or one of the above two elements, but the invention is not limited thereto. In the embodiment, the plurality of first excitation light sources 110 are, for example, a blue laser diode bank, and the first excitation light beam EB1 is a blue laser light beam. The excitation light source module 120 is, for example, a red-blue laser diode bank, the second excitation light beam EB2 is, for example, a blue laser light beam, and the third excitation light beam EB3 is, for example, a red laser light beam, but the invention is not limited thereto. For example, a peak wavelength of the first excitation light beam EB1 is, for example, 455 nm, a peak wavelength of the second excitation light beam EB2 is, for example, 465 nm, and a peak wavelength of the third excitation light beam EB3 is, for example, 638 nm. In other embodiments, the peak wavelength of the first excitation light beam EB1 and the peak wavelength of the second excitation light beam EB2 are, for example, the same 455 nm or the same 465 nm.

Referring to FIG. 2A to FIG. 2H, in the embodiment, the excitation light source module 120 has a first symmetric axis A1 and a second symmetric axis A2, the first symmetric axis A1 and the second symmetric axis A2 are perpendicular to each other, and the first symmetric axis A1 and the second symmetric axis A2 commonly construct a light emitting plane of the excitation light source module 120, wherein the plurality of second excitation light sources 122 and the plurality of third excitation light sources 124 are respectively arranged symmetrically relative to the first symmetric axis A1, and the plurality of second excitation light sources 122 and the plurality of third excitation light sources 124 are respectively arranged symmetrically relative to the second symmetric axis A2. For example, the plurality of second excitation light sources 122 and the plurality of third excitation light sources 124 are arranged in an array. In view of the first symmetric axis A1, the plurality of second excitation light sources 122 located at one side of the first symmetric axis A1 and the plurality of second excitation light sources 122 located at another side of the first symmetric axis A1 are mirror symmetrical, and the plurality of third excitation light sources 124 located at one side of the first symmetric axis A1 and the plurality of third excitation light sources 124 located at another side of the first symmetric axis A1 are also mirror symmetrical. In view of the second symmetric axis A2, the plurality of second excitation light sources 122 located at one side of the second symmetric axis A2 and the plurality of second excitation light sources 122 located at another side of the second symmetric axis A2 are mirror symmetrical, and the plurality of third excitation light sources 124 located at one side of the second symmetric axis A2 and the plurality of third excitation light sources 124 located at another side of the second symmetric axis A2 are also mirror symmetrical. It should be noted that in the embodiment, an arrangement method of array is taken as an example for description, but any symmetrical arrangement method is considered to be within a protection scope of the invention. For example, the first symmetric axis A1 and the second symmetric axis A2 may all be curved lines, and the first symmetric axis A1 and the second symmetric axis A2 commonly construct a light emitting curved surface of the excitation light source module 120.

By integrating the plurality of second excitation light sources 122 and the plurality of third excitation light sources 124 in the same excitation light source module 120, the second excitation light beams EB2 and the third excitation light beams EB3 with different colors may have the same optical path, so as to save a device required volume. Moreover, the plurality of second excitation light sources 122 and the plurality of third excitation light sources 124 of the excitation light source module 120 are arranged symmetrically, such that when the second excitation light beams EB2 and the third excitation light beams EB3 with different colors irradiate the subsequent optical element, incident angles thereof (for example, incident angles of the light beams converged to the light uniforming element 160) are close to each other, so as to provide the illumination light beam IB with uniform color distribution. The projection device 200 of the invention includes the aforementioned illumination system 100, so as to achieve a smaller size, and provide a projection image with uniform color distribution.

In the embodiment, the plurality of second excitation light sources 122 and the plurality of third excitation light sources 124 may be arranged in an array with m rows and n columns, wherein m and n may be respectively any odd number or even number greater than or equal to 1. For example, as shown in FIG. 2A to FIG. 2E, the plurality of second excitation light sources 122 and the plurality of third excitation light sources 124 are arranged in an array with 3 rows and 5 columns. As shown in FIG. 2F, the plurality of second excitation light sources 122 and the plurality of third excitation light sources 124 are arranged in an array with 3 rows and 3 columns. As shown in FIG. 2G to FIG. 2H, the plurality of second excitation light sources 122 and the plurality of third excitation light sources 124 are arranged in an array with 4 rows and 5 columns, but the invention is not limited thereto. In other embodiments, the plurality of second excitation light sources 122 and the plurality of third excitation light sources 124 may be arranged in an array with arbitrary rows and columns, for example, 6 rows/4 columns or 2 rows/7 columns.

In the embodiment, one of the first symmetric axis A1 and the second symmetric axis A2 is at least overlapped with one of the plurality of second excitation light sources 122 or one of the plurality of third excitation light sources. For example, when m is an odd number, the first symmetric axis A1 is at least overlapped with the excitation light source located at the center, or when n is an odd number, the second symmetric axis A2 is at least overlapped with the excitation light source located at the center. Taking FIG. 2A to FIG. 2F as an example, when m and n are all odd numbers, the first symmetric axis A1 and the second symmetric axis A2 are at least overlapped with the second excitation light source 122 located at the center. Taking FIG. 2G and FIG. 2H as an example, when m is an even number and n is an odd number, the first symmetric axis A1 is not overlapped with the second excitation light source 122 located at the center, and the second symmetric axis A2 is at least overlapped with the second excitation light sources 122 located close to the center. In other embodiments, if m and n are both even numbers, the first symmetric axis A1 and the second symmetric axis A2 are both not overlapped with the second excitation light source 122 located at the center. In the embodiments of FIG. 2A to FIG. 2H, the situation that the second excitation light source 122 is located at the center or close to the center is taken as an example for description, though in other embodiments, a situation that the third excitation light source 124 is located at the center or close to the center may also be taken as an example for description.

Moreover, the number of the plurality of second excitation light sources 122 and the number of the plurality of third excitation light sources 124 may be the same, as shown in FIG. 2G. However, the number of the plurality of second excitation light sources 122 and the number of the plurality of third excitation light sources 124 may be different, as shown in FIG. 2A to FIG. 2F and FIG. 2H, so as to adjust the appropriate intensity of light with different colors.

When the plurality of second excitation light sources 122 and the plurality of third excitation light sources 124 are arranged in interleaving, uniformity of the second excitation light beam EB2 and the third excitation light beam EB3 is better, as shown in FIG. 2F, where one second excitation light source 122 located at the center is surrounded by at least 4 third excitation light sources 124 (in other embodiments, if the third excitation light source 124 is located at the center, the one third excitation light source 124 located at the center may also be surrounded by at least 4 second excitation light sources 122).

Figure 2A:
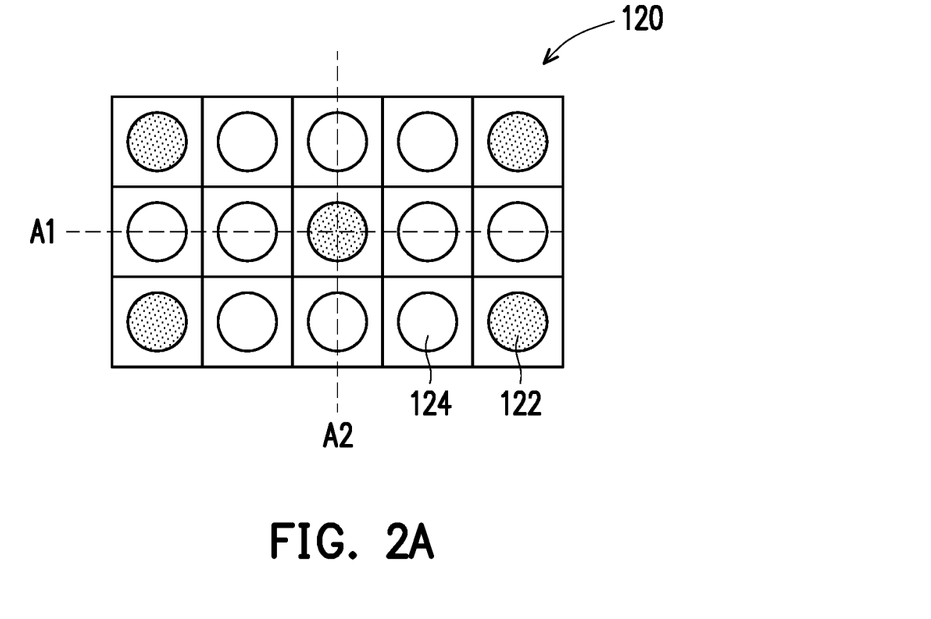
FIG. 2A to FIG. 2H are front views of various implementations of an excitation light source module in FIG. 1.
Figure 2B:
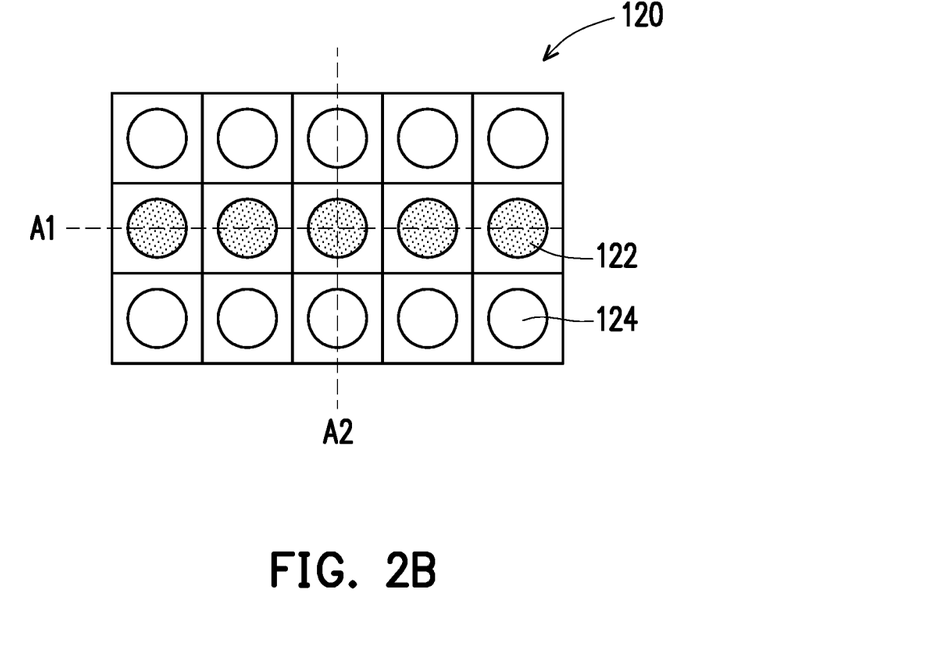
Figure 2C:
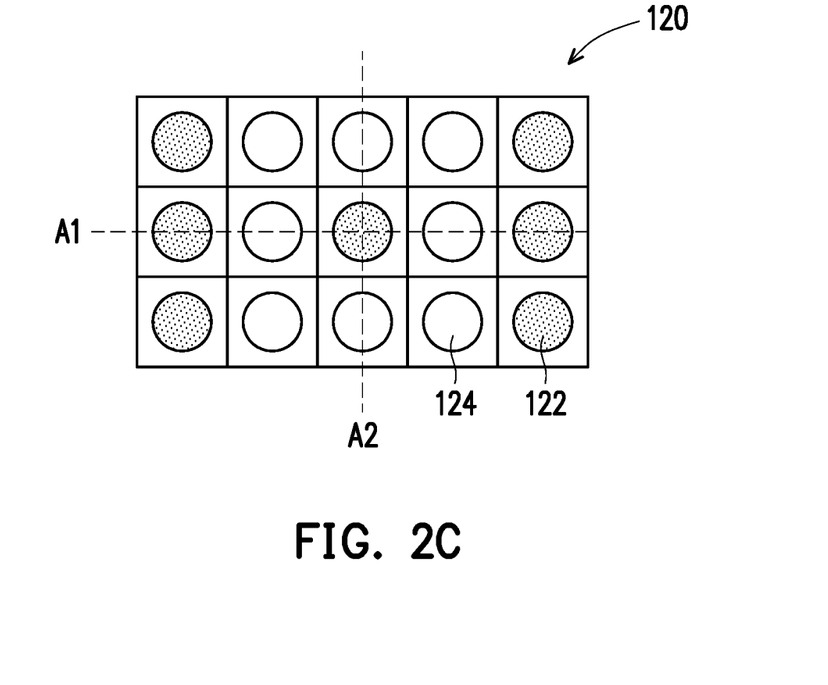
Figure 2D:
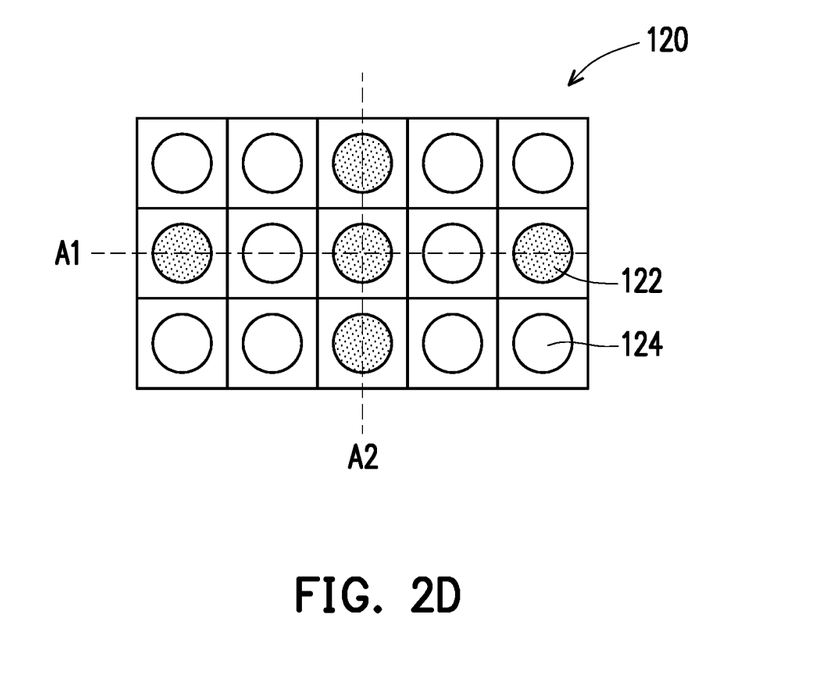
Figure 2E:
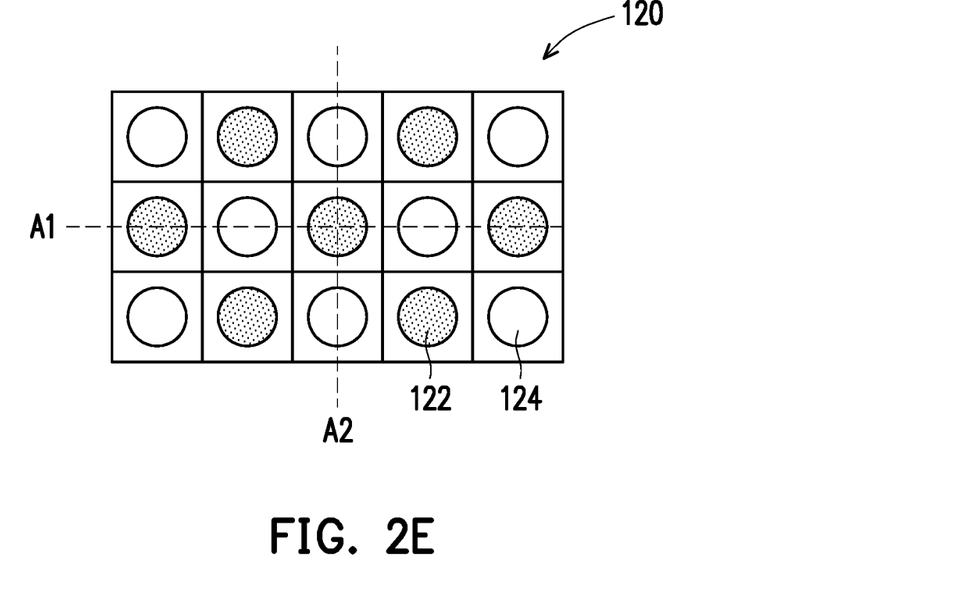
Figure 2F:
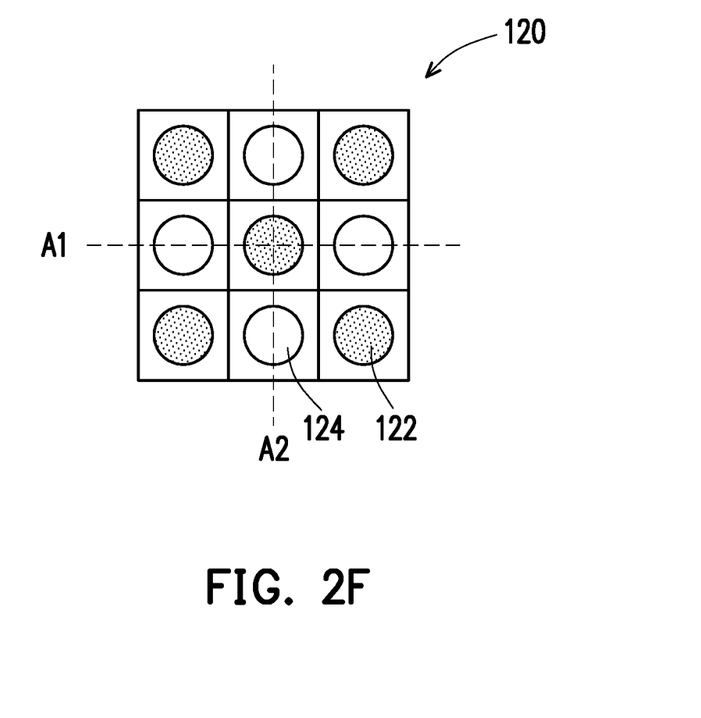
Figure 2G:
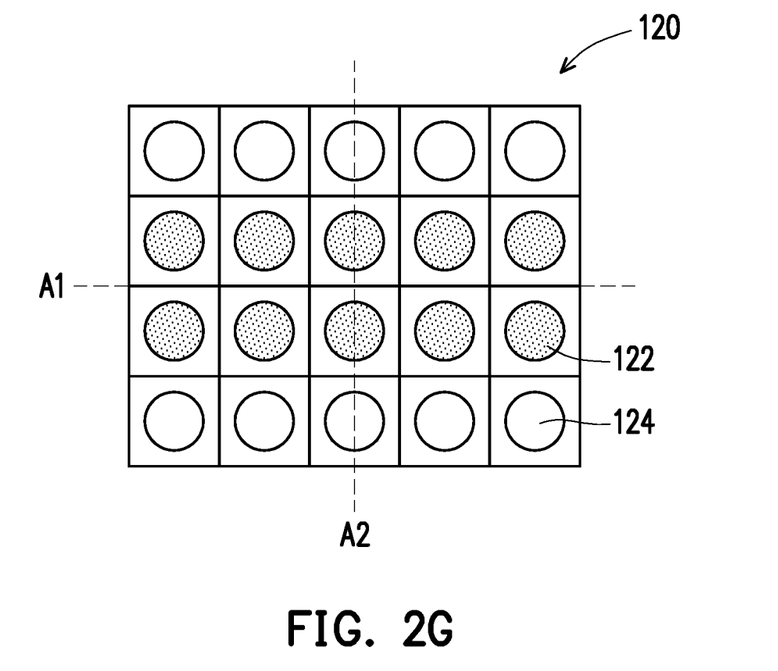
Figure 2H:
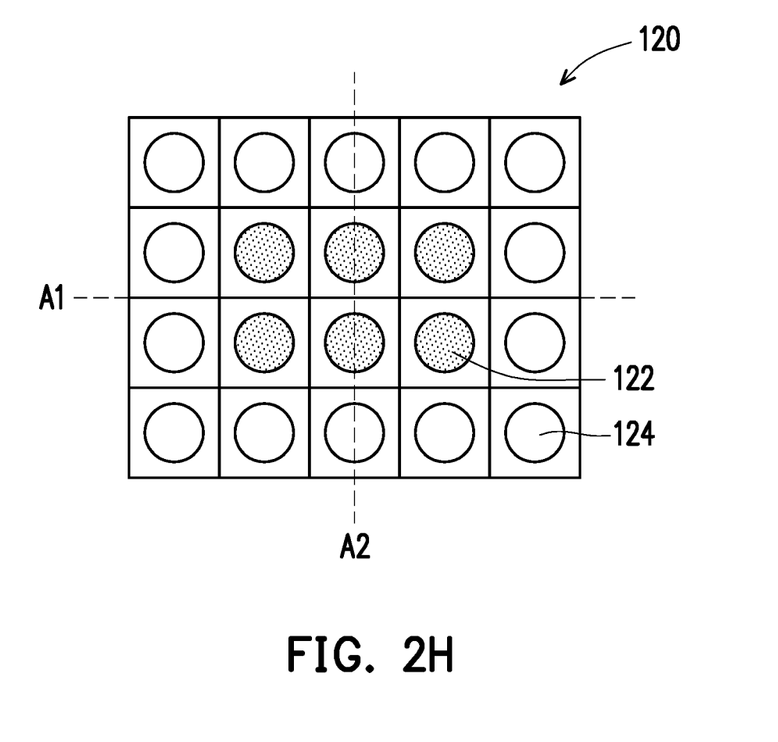
Figure 3:
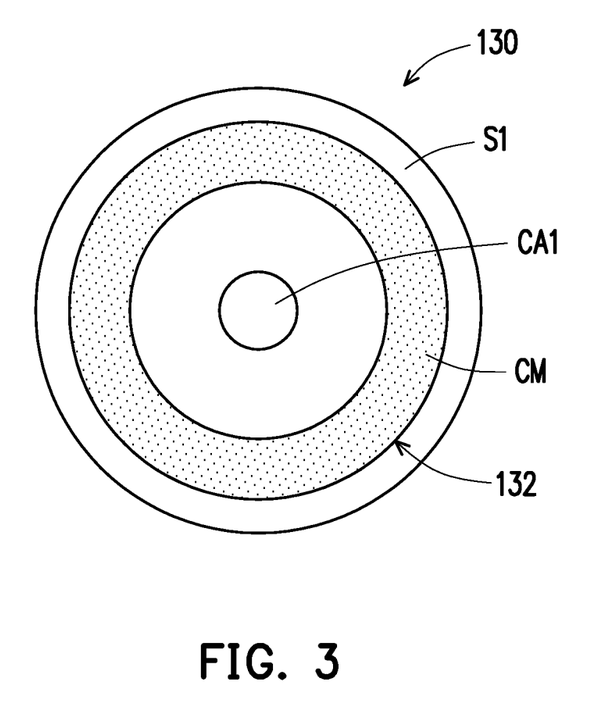
FIG. 3 is a front view of a wavelength conversion element in FIG. 1.

Moreover, since the different excitation light sources require different driving voltages, cooling modules required by the different excitation light sources are probably different, and if the excitation light sources disposed in the same row or the same column are the same, as shown in FIG. 2B and FIG. 2G, where only the second excitation light sources 122 or only the third excitation light sources 124 are disposed in the same row, it avails a layout design of heat pipes of the cooling module, and helps to save a volume of the projection device 200.

It should be noted that since the plurality of second excitation light sources 122 and the plurality of third excitation light sources 124 of the excitation light source module 120 are symmetrically arranged, even if the excitation light source module 120 is rotated by 180 degrees during an assembly process, the plurality of second excitation light sources 122 and the plurality of third excitation light sources 124 in the excitation light source module 120 may still emit light according to a predetermined arrangement, which may increase the ease of assembly.

Moreover, when the excitation light source module 120 has the same number of the excitation light sources in a length direction and a width direction (i.e. when m is equal to n), even if the excitation light source module 120 is rotated by 90 degrees, 180 degrees or 270 degrees during the assembly process, the arrangement of the plurality of second excitation light sources 122 and the plurality of third excitation light sources 124 is not changed, which further increases the easy of assembly.

Figure 4:
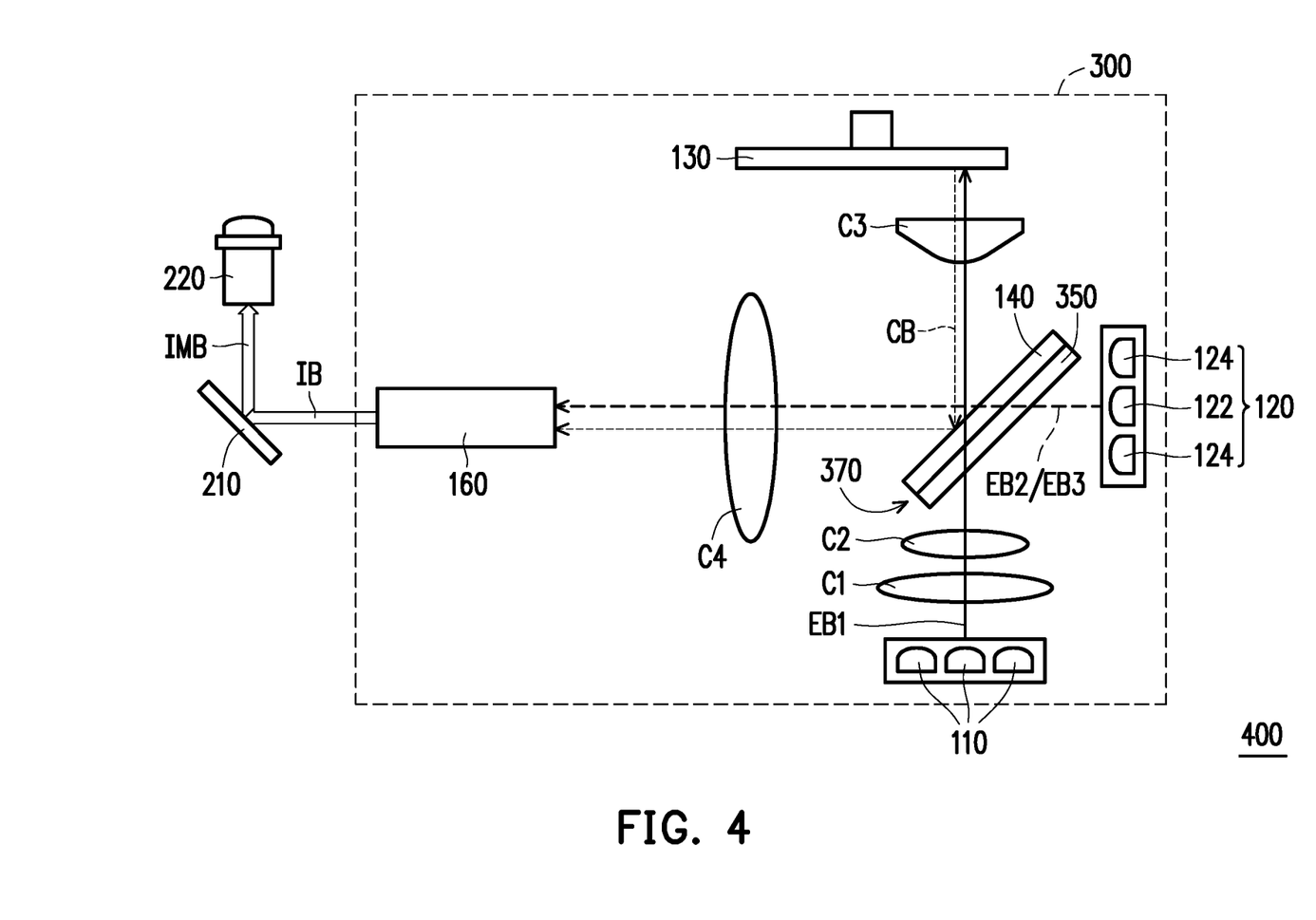
FIG. 4 is a schematic diagram of a projection device according to another embodiment of the invention.

Referring to FIG. 1, FIG. 3 and FIG. 4, in the embodiment, the wavelength conversion element 130 is disposed on a transmission path of the plurality of first excitation light beams EB1, and is configured to convert the plurality of first excitation light beams EB1 into a converted light beam CB. In the embodiment, the wavelength conversion element 130 is a rotatable plate-like element, for example, a phosphor wheel. To be specific, the wavelength conversion element 130 includes a substrate S1 and a central axis CA1, wherein the substrate S1 is, for example, a reflective substrate, and the substrate S1 has an annular wavelength conversion region 132. A driving element of the wavelength conversion element 130 drives the central axis CA1 to rotate, such that the wavelength conversion region 132 cuts into the transmission path of the first excitation light beam EB1 in a rotation manner. A wavelength conversion matter CM is configured in the wavelength conversion region 132, and the wavelength conversion matter CM is, for example, a green phosphor powder. The so-called green phosphor powder is defined as a phosphor powder capable of converting the first excitation light beams EB1 into the converted light beam CB with a green wavelength band. The wavelength conversion element 130 may convert a short-wavelength light beam transmitted to the wavelength conversion region 132 into a long-wavelength light beam. In the embodiment, when the wavelength conversion region 132 cuts into the transmission path of the first excitation light beams EB1, the first excitation light beams EB1 are converted into the converted light beam CB by the wavelength conversion region 132, and the converted light beam CB is reflected by the substrate S1. The converted light beam CB has a third color, and the third color is, for example, a green color. In other embodiments, the wavelength conversion element 130 may also include a plurality of wavelength conversion regions to respectively convert the first excitation light beams EB1 into different color lights, where the plurality of wavelength conversion regions may have different wavelength conversion matters.

Referring back to FIG. 1, the light combining element 140 is disposed on a transmission path of the plurality of second excitation light beams EB2 and the plurality of third excitation light beams EB3. In an embodiment, the light combining element 140 is disposed a transmission path of the plurality of first excitation light beams EB1, the plurality of second excitation light beams EB2, the plurality of third excitation light beams EB3 and the converted light beam CB. The plurality of second excitation light beams EB2 and the plurality of third excitation light beams EB3 are incident to the light combining element 140 along a same direction. To be specific, the light combining element 140 may be a light separating unit, for example, a Dichroic Mirror (DM) or a dichroic prism, which may provide different optical functions to light beams of different colors (to allow light of a different wavelength band range to penetrate through or reflect the same). For example, the light combining element 140, for example, allows the blue color and red color light beam to penetrate through, and provides a reflection function to the green color light beam. In the embodiment, the light combining element 140 may be designed to allow the first excitation light beams EB1, the second excitation light beams EB2 and the third excitation light beams EB3 to penetrate through and reflect the converted light beam CB. Therefore, the plurality of first excitation light beams EB1 coming from the plurality of first excitation light sources 110 penetrate through the light combining element 140 and are transmitted to the wavelength conversion element 130, and the converted light beam CB coming from the wavelength conversion element 130 is reflected to a transmission path that is the same with the transmission path of the plurality of second excitation light beams EB2 and the plurality of third excitation light beams EB3 coming from the excitation light source module 120. In an embodiment, the converted light beam CB may be transmitted to the light combining element 140 after penetrating through a plurality of lenses or being reflected by reflection mirrors. In an embodiment, only after the plurality of second excitation light beams EB2 and the plurality of third excitation light beams EB3 penetrate through a plurality of lenses or being reflected by reflection mirrors, the light combining element 140 reflects the converted light beam CB to the transmission path of the excitation light beams EB2 and EB3, but the invention is not limited thereto.

In the embodiment, the illumination system 100 further includes a diffusion element 150 and a light uniforming element 160. The diffusion element 150 is disposed between the light combining element 140 and the light uniforming element 160, and is configured to reduce or eliminate a laser speckle phenomenon of the second excitation light beams EB2 and the third excitation light beams EB3. For example, the diffusion element 150 is, for example, a rotatable diffuser wheel. The diffusion element 150 is configured with a diffusion sheet, diffusion particles or a diffusion structure, and the diffusion element 150 is driven by a driving element (for example, a motor) to rotate, such that heat generated by the second excitation light beams EB2 and the third excitation light beams EB3 on the diffusion element 150 is easily dissipated evenly, so as to avoid crack or burn of the diffusion element 150. Alternatively, the diffusing element 150 is, for example, a diffuser capable of implementing a vibration motion. The diffusion element 150 is configured with a diffusion sheet, diffusion particles or a diffusion structure, and the diffusion element 150 is driven by a driving element to vibrate, such that the diffusion effect on the second excitation light beams EB2 and the third excitation light beams EB3 passing through the diffusion element 150 may be enhanced, so as to avail to eliminate the speckle phenomenon.

The light uniforming element 160 refers to an optical element capable of uniforming the light beam passing through the light uniforming element 160. In the embodiment, the light uniforming element 160 is disposed on the transmission path of the plurality of second excitation light beams EB2, the plurality of third excitation light beams EB3 and the reflected converted light beam CB coming from the light combining element 140. The plurality of second excitation light beams EB2, the plurality of third excitation light beams EB3 and the converted light beam CB are incident to the light uniforming element 160 along a same direction and an illumination light beam IB is formed to output. In the embodiment, the light uniforming element 160 is, for example, an integration rod. In other embodiments, the light uniforming element 160 may be a lens array or other optical element with a light uniforming effect.

Moreover, the illumination system 100 may further include one to a plurality of lenses, for example, a lens C1 and a lens C2 located between the plurality of first excitation light source 110 and the light combining element 140, a lens C3 located between the light combining element 140 and the wavelength conversion element 130 or a lens C4 located between the light combining element 140 and the light uniforming element 160 for adjusting a light beam path inside the illumination system 100. It should be understood that FIG. 1 and FIG. 4 are diagrams for explaining the projection device and the illumination system provided by the invention, but are not used to limit the light beam path of the projection device and the illumination system.

It should be noted that a part of contents of the aforementioned embodiment is also used in the following embodiment, and descriptions of the same technical contents are omitted. The aforementioned embodiment may be referred for descriptions of the same component name, and detailed descriptions thereof are not repeated in the following embodiment.

FIG. 4 is a schematic diagram of a projection device according to another embodiment of the invention. Referring to FIG. 4, the illumination system 300 of the embodiment is similar to the illumination system 100 of FIG. 1, and a main difference in framework there between is that the diffusion element 350 of the illumination system 300 of the embodiment is disposed on the light combining element 140 to form a composite assembly 370 together with the light combining element 140. The diffusion element 350 is configured with a diffusion sheet, diffusion particles or a diffusion structure, and the composite assembly 370 may be driven by a driving element to vibrate, such that the diffusion effect on the second excitation light beams EB2 and the third excitation light beams EB3 passing through the composite assembly 370 may be enhanced, so as to avail to eliminate the speckle phenomenon.

In the embodiment, the diffusion element 350 may be disposed on the light combining element 140 at a side close to the excitation light source module 120. In other words, the light combining element 140 is located between the wavelength conversion element 130 and the diffusion element 350, such that the converted light beam CB may be directly transmitted to the light combining element 140 to reflect, so as to avoid reducing a light intensity of the converted light beam CB due to that the converted beam CB penetrates through the diffusion element 350.

In summary, in the illumination system of the embodiment of the invention, by integrating the plurality of second excitation light sources and the plurality of third excitation light sources in one excitation light source module, the second excitation light beams and the third excitation light beams may have a same optical path, so as to reduce a volume. Moreover, the plurality of second excitation light sources and the plurality of third excitation light sources of the excitation light source module are symmetrically arranged, such that incident angles of the second excitation light beams and the third excitation light beams irradiating the subsequent optical element are close to each other, so as to provide the illumination light beam with uniform color distribution. The projection device of the invention includes the aforementioned illumination system, so as to achieve a smaller size, and provide a projection image with uniform color distribution.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
  a plurality of first excitation light sources, configured to emit a plurality of first excitation light beams;

an excitation light source module, comprising a plurality of second excitation light sources and a plurality of third excitation light sources, wherein the second excitation light sources are configured to emit a plurality of second excitation light beams, and the third excitation light sources are configured to emit a plurality of third excitation light beams;

a wavelength conversion element, disposed on a transmission path of the first excitation light beams, and configured to convert the first excitation light beams into a converted light beam; and a light combining element, disposed on a transmission path of the second excitation light beams and the third excitation light beams, and reflecting the converted light beam to the transmission path of the second excitation light beams and the third excitation light beams, wherein the excitation light source module has a first symmetric axis and a second symmetric axis, the first symmetric axis and the second symmetric axis are perpendicular to each other, wherein the second excitation light sources and the third excitation light sources are respectively arranged symmetrically relative to the first symmetric axis, and the second excitation light sources and the third excitation light sources are respectively arranged symmetrically relative to the second symmetric axis.

2. The illumination system as claimed in claim 1, wherein the second excitation light sources and the third excitation light sources are arranged in an array, and excitation light sources disposed in a same row or a same column are the same.

3. The illumination system as claimed in claim 1, wherein the second excitation light beams emitted by the second excitation light sources have a first color, and the third excitation light beams emitted by the third excitation light sources have a second color, wherein a difference between main wavelengths of the first color and the second color is greater than or equal to 50 nm.

4. The illumination system as claimed in claim 1, wherein the second excitation light beams and the third excitation light beams are incident to the light combining element along a same direction.

5. The illumination system as claimed in claim 1, further comprising a light uniforming element, wherein the light uniforming element is disposed on a transmission path of the second excitation light beams, the third excitation light beams and a reflected converted light beam coming from the light combining element.

6. The illumination system as claimed in claim 5, wherein the second excitation light beams, the third excitation light beams and the converted light beam are incident to the light uniforming element along a same direction.

7. The illumination system as claimed in claim 5, further comprising a diffusion element, wherein the diffusion element is disposed between the light combining element and the light uniforming element.

8. The illumination system as claimed in claim 1, further comprising a diffusion element, wherein the diffusion element is disposed on the light combining element to form a composite assembly together with the light combining element.

9. The illumination system as claimed in claim 8, wherein the diffusion element is disposed on the light combining element at a side close to the excitation light source module.

10. The illumination system as claimed in claim 1, wherein one of the first symmetric axis and the second symmetric axis is at least overlapped with one of the second excitation light sources or one of the third excitation light sources.

11. The illumination system as claimed in claim 1, wherein the first excitation light beams emitted by the first excitation light sources and the second excitation light beams emitted by the second excitation light sources have a first color, and the third excitation light beams emitted by the third excitation light sources have a second color.

12. The illumination system as claimed in claim 11, wherein the converted light beam have a third color.

13. A projection device, comprising:
an illumination system, configured to emit an illumination light beam, and comprising:
a plurality of first excitation light sources, configured to emit a plurality of first excitation light beams;
an excitation light source module, comprising a plurality of second excitation light sources and a plurality of third excitation light sources, wherein the second excitation light sources are configured to emit a plurality of second excitation light beams, and the third excitation light sources are configured to emit a plurality of third excitation light beams;
a wavelength conversion element, disposed on a transmission path of the first excitation light beams, and configured to convert the first excitation light beams into a converted light beam; and
a light combining element, disposed on a transmission path of the second excitation light beams and the third excitation light beams, and reflecting the converted light beam to the transmission path of the second excitation light beams and the third excitation light beams,
wherein the excitation light source module has a first symmetric axis and a second symmetric axis, the first symmetric axis and the second symmetric axis are perpendicular to each other, wherein the second excitation light sources and the third excitation light sources are respectively arranged symmetrically relative to the first symmetric axis, and the second excitation light sources and the third excitation light sources are respectively arranged symmetrically relative to the second symmetric axis;
a light valve, disposed on a transmission path of the illumination light beam to convert the illumination light beam into an image light beam; and
a projection lens, disposed on a transmission path of the image light beam.

14. The projection device as claimed in claim 13, wherein the second excitation light sources and the third excitation light sources are arranged in an array, and excitation light sources disposed in a same row or a same column are the same.

15. The projection device as claimed in claim 13, wherein the second excitation light beams emitted by the second excitation light sources have a first color, and the third excitation light beams emitted by the third excitation light sources have a second color, wherein a difference between main wavelengths of the first color and the second color is greater than or equal to 50 nm.

16. The projection device as claimed in claim 13, wherein the second excitation light beams and the third excitation light beams are incident to the light combining element along a same direction.

17. The projection device as claimed in claim 13, wherein the illumination system further comprises a light uniforming element, wherein the light uniforming element is disposed on a transmission path of the second excitation light beams, the third excitation light beams and a reflected converted light beam coming from the light combining element.

18. The projection device as claimed in claim 17, wherein the second excitation light beams, the third excitation light beams and the converted light beam are incident to the light uniforming element along a same direction.

19. The projection device as claimed in claim 17, wherein the illumination system further comprises a diffusion element, wherein the diffusion element is disposed between the light combining element and the light uniforming element.

20. The projection device as claimed in claim 13, wherein the illumination system further comprises a diffusion element, wherein the diffusion element is disposed on the light combining element to form a composite assembly together with the light combining element.

21. The projection device as claimed in claim 20, wherein the diffusion element is disposed on the light combining element at a side close to the excitation light source module.

22. The projection device as claimed in claim 13, wherein one of the first symmetric axis and the second symmetric axis is at least overlapped with one of the second excitation light sources or one of the third excitation light sources.

23. The projection device as claimed in claim 13, wherein the first excitation light beams emitted by the first excitation light sources and the second excitation light beams emitted by the second excitation light sources have a first color, and the third excitation light beams emitted by the third excitation light sources have a second color.

24. The projection device as claimed in claim 23, wherein the converted light beam has a third color.

* * * * *